United States Patent [19]

Barrington

[11] Patent Number: 4,522,266
[45] Date of Patent: Jun. 11, 1985

[54] DOWNHOLE TESTER VALVE WITH RESILIENT SEALS

[75] Inventor: Burchus Q. Barrington, Duncan, Okla.

[73] Assignee: Halliburton Company, Duncan, Okla.

[21] Appl. No.: 355,231

[22] Filed: Mar. 5, 1982

[51] Int. Cl.³ .............................................. E21B 34/06
[52] U.S. Cl. ..................................... 166/330; 251/316
[58] Field of Search .............. 166/332, 334, 321, 330, 166/373, 328; 251/316, 170

[56] References Cited

U.S. PATENT DOCUMENTS

| | | |
|---|---|---|
| 3,109,623 | 11/1963 | Bryant . |
| 3,154,094 | 10/1964 | Bredtschneider ................... 251/316 |
| 3,209,779 | 10/1965 | McGowen, Jr. . |
| 3,218,024 | 11/1965 | Kroekel . |
| 3,315,697 | 4/1967 | Oliver . |
| 3,356,145 | 12/1967 | Fredd . |
| 3,421,733 | 1/1969 | Stewart, Jr. . |
| 3,463,449 | 8/1969 | Nelson et al. . |
| 3,480,253 | 11/1969 | Priese et al. . |
| 3,497,178 | 2/1970 | Priese . |
| 3,508,738 | 4/1970 | Atkinson et al. . |
| 3,617,025 | 11/1971 | Gerbic et al. . |
| 3,819,150 | 6/1974 | Kajrup . |
| 3,842,913 | 10/1974 | Mott . |
| 3,856,085 | 12/1974 | Holden et al. . |
| 3,870,104 | 3/1975 | Mott . |
| 3,901,315 | 8/1975 | Parker ................................. 166/321 |
| 3,915,228 | 10/1975 | Giebeler ............................. 166/321 |
| 3,916,940 | 11/1975 | Allen . |
| 3,964,544 | 6/1976 | Farley et al. . |
| 4,023,773 | 5/1977 | Wise .................................... 251/316 |

FOREIGN PATENT DOCUMENTS

| | | | |
|---|---|---|---|
| 123494 | 1/1958 | U.S.S.R. ............................ | 166/328 |

Primary Examiner—William F. Pate, III
Attorney, Agent, or Firm—Joseph A. Walkowski; Thomas R. Weaver

[57] ABSTRACT

A downhole tool apparatus includes an improved full opening ball valve structure having seat assemblies with replaceable resilient seats, which assemblies are supported within the tool by an adjustable supporting structure.

9 Claims, 6 Drawing Figures

DOWNHOLE TESTER VALVE WITH RESILIENT SEALS

The present invention relates generally to downhole tools and more particularly, but not by way of limitation, to an annulus pressure responsive full opening ball valve tester.

A great many downhole tools utilized in oil and gas wells include full opening ball valves which open and close a central axial passage through the downhole tool. Such downhole tools may be tester valves, sampling apparatus or the like.

The present invention provides an improved ball valve structure which is particularly improved in the construction of the seat assemblies within which the ball itself is held, and in the structure which mounts the ball and seat assemblies within a housing of the tool.

A typical prior art full opening ball valve in a downhole tool is shown in U.S. Pat. No. 4,113,018 to Barrington et al., which is assigned to the assignee of the present invention. Referring to FIG. 2b of the Barrington et al. patent, a typical prior art ball valve structure is thereshown which includes a ball which is held between a pair of metal seats which are initially urged into engagement with the ball by means of a Belleville spring 59. The main force for holding the seats against the ball is provided by hydraulic pressure acting on a differential area of the seat holder assembly between the outside diameter of seals 89 and an effective inner diameter determined by the geometry of the engagement of the seat with the ball. With this typical prior art arrangement the ball and the pair of metal seats must be manufactured as a matched set and the seats must be lapped to the ball to assure the required close tolerance fit to accomplish the necessary seating.

A major disadvantage of this prior art arrangement is that when one of the seats is damaged during use, the entire set of the ball and the pair of seats must be thrown away and replaced with a new matched set, because individual components cannot be replaced.

The present invention provides an improved seat construction wherein the seats are constructed from a resilient material rather than from metal. The seats are trapped within a tapered groove defined between a seat holder and a seat retainer, and the seats extend out of the groove to engage the ball so that the ball itself does not touch the metallic seat holder and seat retainer. With the resilient seat, it is not necessary to match the seats to the ball by lapping or the like, since the seats will conform to the surface of the ball. Furthermore, since the seats themselves are resilient, the initial spring loading used in prior art valves, such as by Belleville spring 59 of the Barrington et al. reference, for the seats is no longer required, and the structure which supports the ball and the seat assemblies within the housing of the tool is made rigid. This structure provides a threaded adjustment whereby the compressional preload between the resilient seats and the ball may be adjusted mechanically.

Numerous objects, features and advantages of the present invention will be readily apparent to those skilled in the art upon a reading of the following description when taken in conjunction with the accompanying drawings.

FIGS. 1A–1B comprise an elevation left side only sectioned view of a downhole tool, which could be a testing valve or the like, including the improved ball valve and seat structure of the present invention.

Figure 1A:
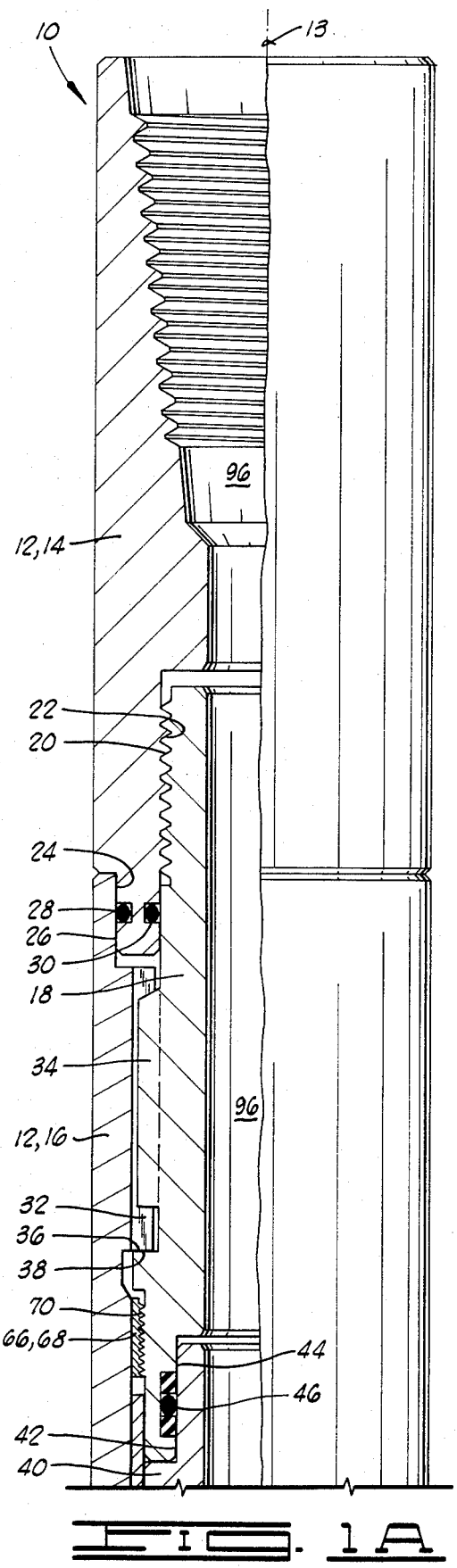
Figure 1B:
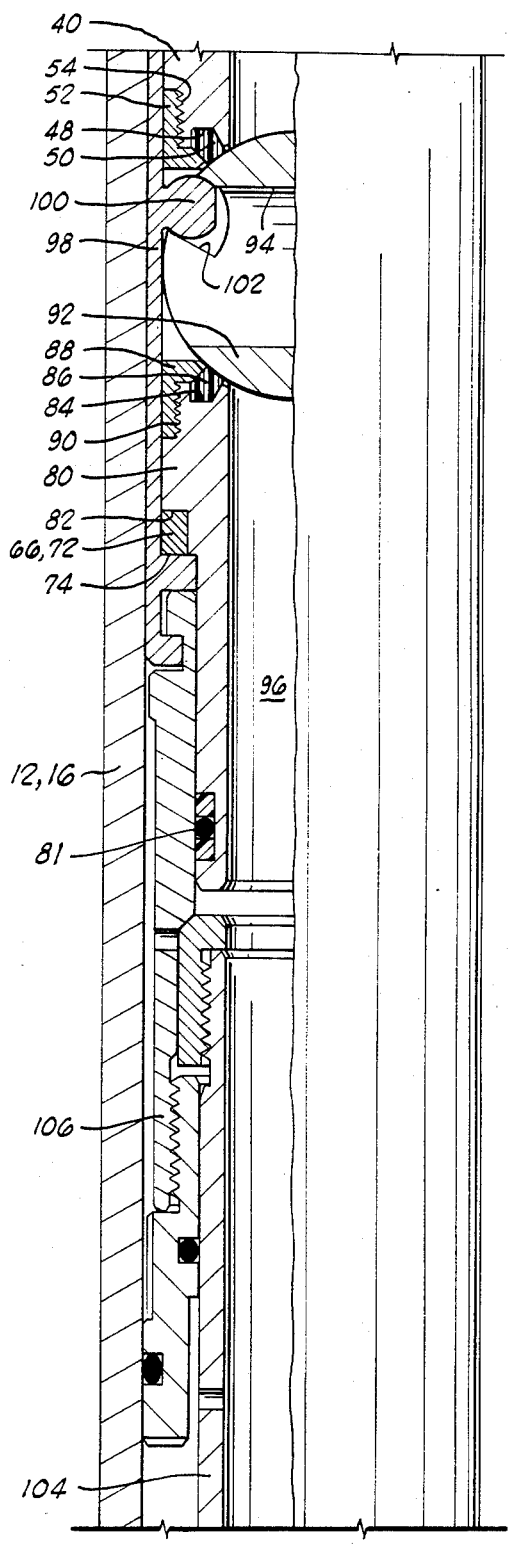

Referring now to the drawings and particularly to FIGS. 1A and 1B, a downhole tool apparatus is shown and generally designated by the numeral 10. The downhole tool 10 may be a tester valve or the like, and it is noted that only the upper portions of the downhole tool 10 are shown which include the improved ball valve structure. The lower portions of the tool which would be located below the bottom of the structure shown in FIG. 1B may be constructed as shown in an application of Burchus Q. Barrington entitled "Tester Valve with Silicone Liquid Spring" which is assigned to the assignee of the present invention and is filed on even date herewith, or it may be constructed in any suitable manner to provide actuation of the power mandrel which moves the operating pin to rotate the ball valve as further described below. By way of additional example, the ball valve and seat structure of the downhole tool 10 of the present invention could be utilized in place of the structure shown in FIG. 2b of Barrington et al. U.S. Pat. No. 4,113,018 discussed above.

The downhole tool 10 includes a cylindrical housing 12 which includes an upper housing adapter 14 and a valve housing section 16. Housing 12 has a longitudinal axis 13.

A holder mandrel 18 has an externally threaded upper end 20 threadedly connected to an internally threaded surface 22 of a lower end of upper housing adapter 14.

The valve housing section 16 has an upper inner cylindrical surface 24 in which is closely received a lower outer cylindrical surface 26 of upper housing adapter 14. A resilient seal 28 is provided between surfaces 24 and 26, and a resilient seal 30 is provided between upper adapter 14 and holder mandrel 18.

The valve housing section 16 includes a plurality of radially inwardly extending splines 32 which are meshed with a plurality of radially outwardly extending splines 34 of holder mandrel 18.

Holder mandrel 18 includes a radially outwardly extending upward facing ledge 36 which is located below and engages lower ends 38 of the radially inwardly extending splines 32 so that the valve housing section 16 is held longitudinally and rotationally fixed relative to the upper housing adapter 14 by means of the holder mandrel 18.

An upper seat holder 40 has an upper cylindrical outer surface 42 closely received in a lower bore 44 of holder mandrel 18. A resilient seal 46 is provided between upper seat holder 40 and the bore 44.

Upper seat holder 40 includes a first annular groove 48 in a lower end thereof, within which is received an upper annular resilient seat 50. An upper seat retainer 52 is threadedly attached to upper seat holder 40 at 54 to hold the upper seat 50 in the groove 48.

Figure 4:
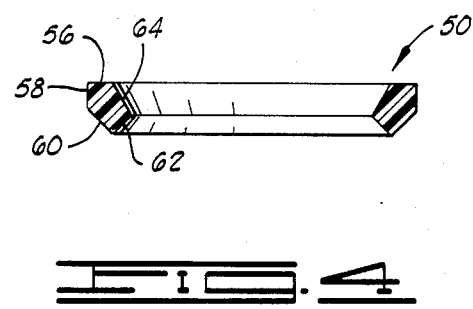
FIG. 4 is a sectioned view taken along line 4—4 of FIG. 5 showing the cross-sectional configuration of the resilient seats.
Figure 5:
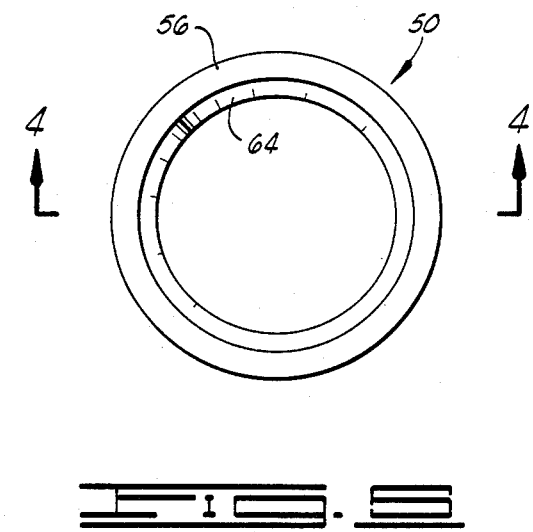
FIG. 5 is a plan view of one of the resilient seats.

Referring to FIGS. 4 and 5, section and plan views, respectively, are thereshown of the upper seat 50. The seat 50 has a shape defined by five intersecting surfaces. A flat annular first surface 56 defines a plane normal to the longitudinal axis 13 of the housing 12.

An outer cylindrical second surface 58 is oriented normal to and extending longitudinally downward from an outer circumference of the first surface 56.

An outer frusto-conical third surface 60 extends downward from and tapers radially inward from a lower end of the second surface 58. The third surface 60 may be said to extend and taper radially inward from the lower end of second surface 58 away from the first surface 56.

An inner frusto-conical fourth surface 62 extends and tapers radially inward from a lower end of the third surface 60 toward the first surface 56.

An inner frusto-conical fifth surface 64 joins the fourth surface 62 with the first surface 56.

It can be seen in FIG. 1B that the third and fifth surfaces 60 and 64 taper downwardly toward each other as they extend from the groove 48, so that the upper seat 50 is trapped in the groove 48 by the upper seat holder 50 and the upper seat retainer 52. This prevents high fluid pressures which are encountered in oil wells from blowing the seat 50 out of the groove 48 during the operation of the valve.

A cylindrical collar 66 has an internally threaded upper end 68 threadedly attached to an outer threaded surface 70 of holder mandrel 18 below the ledge 36. Collar 66 has a radially inwardly extending lip 72 at a lower end 74 thereof.

Figure 2:
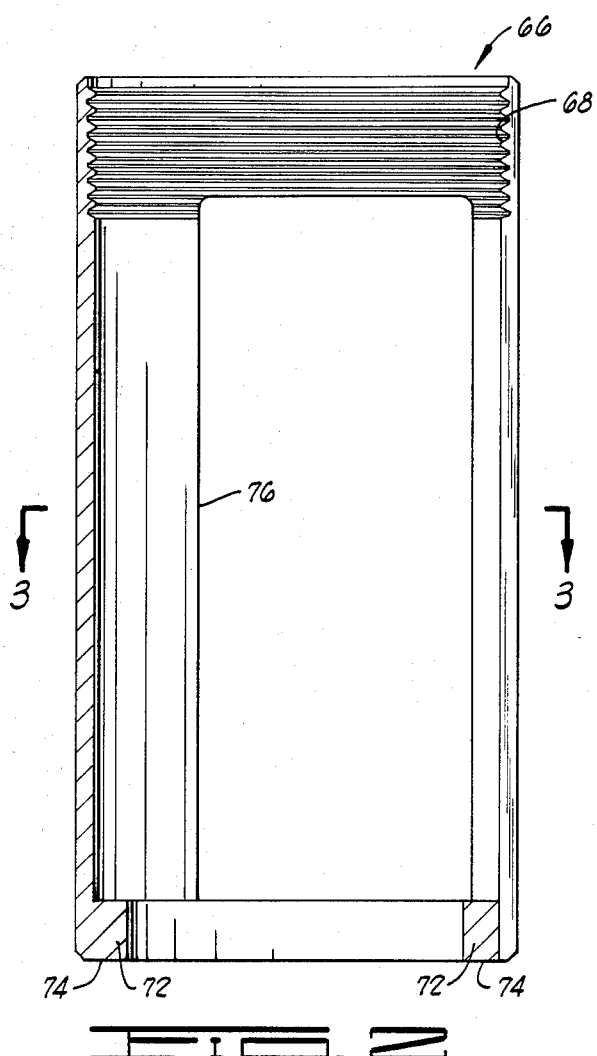
FIG. 2 is an elevation sectioned view of a collar which holds the two seat assemblies together.
Figure 3:
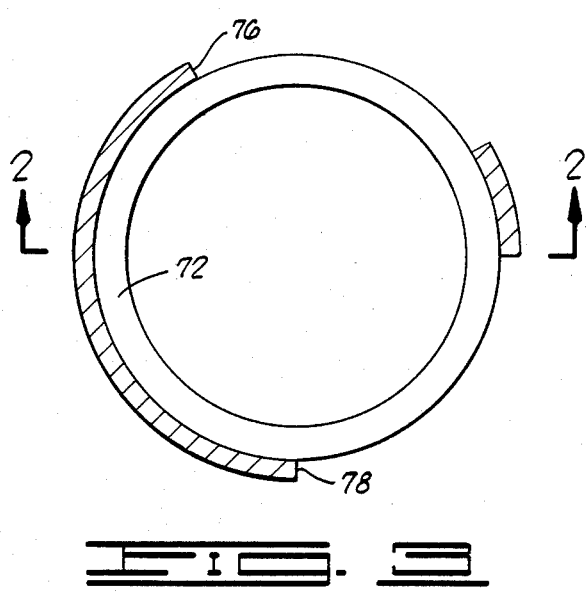
FIG. 3 is a view along line 3—3 of FIG. 2.

Collar 66 is best seen in sectioned elevation and plan views in FIGS. 2 and 3, respectively. As is there shown, there are two longitudinal openings 76 and 78 in the collar 66.

A lower seat holder 80 has a radially outwardly extending downward facing surface 82 engaging an upper side of the lip 72 of collar 66. A seal 81 is provided between a lower portion of seat holder 80 and a bore of connector assembly 106 within which it is received.

A second annular seat receiving groove 84 is disposed in the upper end of lower seat holder 80 and has a lower annular resilient seat 86 received therein. A lower seat retainer 88 is threadedly attached to the lower seat holder 80 at threaded connection 90 to hold the lower seat 86 in the groove 84 in a manner similar to that just described for the upper seat 50.

A ball valve 92 is spherical in shape and has a central bore 94 therethrough. The ball valve 92 is shown in FIG. 1B in its closed position wherein its bore 94 is isolated from a longitudinal axial flow passageway 96 of the downhole tool 10 by the upper and lower seats 50 and 86. The ball valve 92 sealingly engages the upper and lower resilient seats 50 and 86.

An operating means 98 includes a pin 100 which extends through one of the longitudinal openings 76 or 78 into an eccentric hole 102 of ball valve 92. Actually there are two pins such as 100 which are eccentrically located on opposite sides of the bore 94 in a manner known to those skilled in the art, and one of the pins extends through the opening 76 of the collar 66 and the other of the pins extends through the opening 78 of the collar 66. When the operating means 98 is moved longitudinally downward relative to the housing 12 from the position shown in FIG. 1B, the ball valve 92 is rotated within the seats 50 and 86 to an open position wherein the bore 94 is aligned with the flow passage 96.

The operating means 98 is moved longitudinally within the housing 12 by a power mandrel 104 which is connected to the operating means 98 by a connector assembly 106.

The power mandrel 104 may, for example, be powered by an annular piston which is responsive to changes in annulus pressure within an oil well.

The structure just described provides a number of advantages as compared to prior art structures such as that illustrated in FIG. 2b of Barrington et al. U.S. Pat. No. 4,113,018 referred to above.

Since the seat retainers are detachably connected to the seat holders, the seats 50 and 86, or either one of them separately, may be replaced if they are damaged during operation by merely disconnecting the seat retainer from the seat holder and removing the original resilient seat and replacing it with a new one. There is no need for expensive machine lapping as was involved in the prior art where metal seats were used to seat against the metal ball. Thus, it is not necessary to scrap an entire assembly including a ball and both seats when there is damage to one of the components. Additionally, the ball need not have nearly so fine a surface finish for use with resilient seats, as compared to metal seats, thus further decreasing expense of manufacture.

Another particular advantage provided by this structure is that the compressional preload between the seats 50 and 86 and the ball valve 92 may be increased by tightening the threaded connection 68, 70 between the collar 66 and the holder mandrel 18. In the prior art device such as that of the Barrington et al. U.S. Pat. No. 4,113,018, no such adjustment was provided since the upper and lower seat assemblies thereof were held together by C-clamps such as indicated by the numeral 58 in FIG. 2b of the Barrington et al. patent. Springs such as the Belleville springs 59 shown in the Barrington et al. reference were used to initially bias the metal seats into engagement with the metal ball. The main force for holding the seats against the ball of the present invention is based upon the same principle as in the Barrington et al. reference, namely hydraulic pressure acting on differential areas, however the structure of the present invention which accomplishes this hydraulic biasing is considerably simplified as can readily be seen from a comparison of the two structures.

Another important feature of the present invention is the fact that the tapering of the seats such as the tapering of the surfaces 60 and 64 of upper seat 50 toward the open side of the groove from which they extend to engage the ball valve 92 causes those seats to be trapped or wedged within the groove so that they cannot be removed without first disconnecting the seat retainer from the seat holder. Thus, during operation of the ball valve 92 when the bore 94 thereof passes the seats 50 and 86, the seats cannot be blown out of the seat holders by the high fluid pressures involved.

Thus it is seen that the apparatus of the present invention readily achieves the ends and advantages mentioned as well as those inherent therein. While certain preferred embodiments of the invention have been illustrated for the purposes of the present disclosure, numerous changes in the arrangement and construction of parts may be made by those skilled in the art which changes are encompassed within the scope and spirit of the present invention as defined by the appended claims.

What is claimed is:

1. A downhole tool apparatus comprising:
a cylindrical downhole housing;
a ball valve disposed in said housing;
an operating means, operatively associated with said ball valve for rotating said ball valve within said housing upon relative longitudinal movement between said operating means and said ball;

first and second seat holder assemblies disposed on diametrically opposite sides of said ball valve, said first seat holder assembly including:

a first seat holder;

a first seat retainer detachably connected to said first seat holder to define a first annular groove for receiving first seat; and an annular resilient first seat captured in said first annular groove so that said first seat holder and first seat retainer must be disconnected to remove saif first seat from said first annular groove, and wherein said first seat extends out of said first annular groove so that said ball valve engages said first seat without engaging said first seat holder or said first seat retainer; and adjustable holding means, operably associated with said first and second seat holder assemblies, for holding said first and second seat holder assemblies in place on said opposite sides of said ball valve, said holding means being adjustable via a threaded connection between two parts thereof to vary a compressional preload of said first seat and of an annular resilient second seat of said second seat holder assembly against said ball valve, said adjustable holding means including:

a cylindrical collar having said ball valve and portions of said first and second set holder assemblies disposed therein, said collar having a longitudinal opening through which a pin of said operating means extends, said collar being one of said two parts forming threaded connection.

2. The apparatus of claim 1, wherein:
said ball valve is longitudinally fixed relative to said housing and said operating means is longitudinally movable relative to said housing.

3. The apparatus of claim 1, wherein:
said first seat retainer is threadedly connected to said first seat holder.

4. The apparatus of claim 1, wherein:
said first seat has a shape defined by:
 a flat annular first surface normal to a longitudinal axis of said housing;
 an outer cylindrical second surface oriented normal to and extending longitudinally from an outer circumference of said first surface;
 an outer frusto-conical third surface extending and tapering radially inward from an end of said second surface away from said first surface;
 an inner frusto-conical fourth surface extending and tapering radially inward from an end of said third surface toward said first surface; and
 an inner frusto-conical fifth surface joining said fourth and first surfaces.

5. A downhole tool apparatus, comprising:
an upper housing adapter;
a holder mandrel having an externally threaded upper end threadedly connected to an internally threaded surface of a lower end of said upper housing adapter;
a valve housing section having an upper inner cylindrical surface in which is closely and sealingly received a lower outer cylindrical surface of said upper housing adapter, said valve housing including a plurality of radially inward extending splines meshed with a plurality of radially outward extending splines of said holder mandrel, said holder mandrel including a radially outward extending upward facing ledge engaging lower ends of said radially inward extending splines so that said valve housing is held longitudinally and rotationally fixed relative to said upper housing adapter;

an upper seat holder having an upper cylindrical outer surface closely and sealingly received in a lower bore of said holder mandrel;

an upper annular resilient seat disposed in a groove of said upper seat holder;

an upper seat retainer threadedly attached to said upper seat holder to hold said upper seat in said groove of said upper seat holder;

a cylindrical collar having an internally threaded upper end threadedly attached to an outer threaded surface of said holder mandrel below said ledge, and having a radially inward extending lip at a lower end thereof;

a lower seat holder having a radially outward extending downward facing surface engaging an upper side of said lip;

a lower annular resilient seat disposed in a groove in said lower seat holder;

a lower seat retainer threadedly attached to said lower seat holder to hold said lower seat in said groove of said lower seat holder;

a ball valve disposed between and sealingly seated against said upper and lower annuular resilient seats; and an operating means including a pin extending through a longitudinal opening of said collar, said operating means being longitudinally movable relative to said housing and said ball valve and being operatively associated with said ball valve to rotate said ball valve within said housing and to thereby open and close said ball valve.

6. A ball valve and seat assembly, comprising:
an upper seat holder means having a first groove disposed in a lower end thereof;
an upper annular resilient seat disposed in and extending downwardly out of said first groove;
an upper seat retainer means, detachably connected to said upper seat holder means, for retaining said upper seat in said first groove;
a lower seat holder means having a second groove disposed in an upper end thereof;
a lower annular resilient seat disposed in and extending upwardly out of said second groove;
a lower seat retainer means, detachably connected to said lower seat holder means, for retaining said lower seat in said second groove;
a ball valve located between and sealingly engaging said upper and lower annular resilient seats; and
a cylindrical holding collar having a radially inward extending protrusion on a first end thereof engaging a surface of one of said upper and lower seat holder means, said surface facing away from the other of said upper and lower seat holder means, and wherein a second end of said collar and the other of said upper and lower seat holder means have a threaded connection therebetween so that a compressional preload of said upper and lower annular resilient seats against said ball valve may be adjusted by adjusting said threaded connection.

7. The assembly of claim 6, wherein:
said upper and lower seat retainer means are threadedly connected to said upper and lower seat holder means, respectively.

8. A downhole tool apparatus comprising:
a cylindrical tool housing;
a ball valve disposed in said housing;
an operating means, operatively associated with said ball valve within said housing upon relative longitudinal movement between said operating means and said ball;
at least a first seat assembly disposed adjacent said ball valve, said first seat assembly including:
a first seat holder and a first seat retainer connected thereto to define a first annular groove therebetween; and
an annular resilient first seat in said first groove, said annular resilient first seat having a shape defined by:
  a flat annular first surface normal to a longitudinal axis of said housing;
  an outer cylindrical second surface oriented normal to and extending longitudinally from an outer circumference of said first surface;
  an outer frusto-conical third surface extending and tapering radially inward from an end of said second surface away from said first surface;
  an inner frusto-conical fourth surface extending and tapering radially inward from an end of said third surface toward said first surface; and
  an inner frusto-conical fifth surface joining said fourth and first surface;
wherein said first seat extends out of said first annular groove so that said ball valve engages said first seat without engaging said first seat holder or said first seat retainer.

9. The downhole tool apparatus of claim 8, wherein said second seat holder assembly includes:
a second seat holder;
a second seat retainer detachably connected to said second seat holder to define a second annular groove for receiving a second seat; and
an annular resilient second seat in said second groove, said annular resilient second seat having a shape defined by:
  a flat annular first surface normal to a longitudinal axis of said housing;
  an outer cylindrical second surface oriented normal to and extending longitudinally from an outer circumference of said first surface;
  an outer frusto-conical third surface extending and tapering radially inward from an end of said second surface away from said first surface;
  an inner frusto-conical fourth surface extending and tapering radially inward from an end of said third surface toward said first surface; and
  an inner frusto-conical fifth surface joining said fourth and first surfaces; annular
wherein said second seat extends out of said second groove so that said ball valve engages said second seat without engaging said second seat holder or said second seat retainer.

* * * * *